H. N. FRENTRESS.

WIRE FENCE-BARB.

No. 7,698. Reissued May 22, 1877.

Witnesses
Forde R. Smith
F. Crumbaugh Jr.

Henry N. Frentress Inventor
By Munday & Evarts.
Attorneys

N. PETERS, Photo-Lithographer, Washington, D. C.

UNITED STATES PATENT OFFICE.

HENRY N. FRENTRESS, OF DUNLEITH, ILLINOIS.

IMPROVEMENT IN WIRE-FENCE BARBS.

Specification forming part of Letters Patent No. 171,008, dated December 14, 1875; reissue No. 7,698, dated May 22, 1877; application filed March 30, 1877.

DIVISION B.

*To all whom it may concern:*

Figure 1:
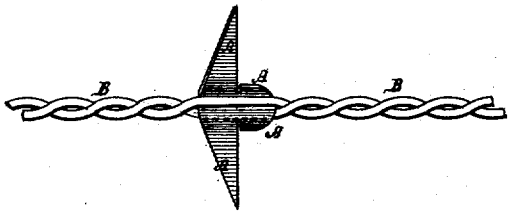
Figure 2:
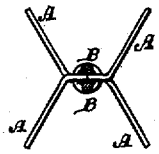

Be it known that I, HENRY N. FRENTRESS, of Dunleith, in the county of Jo Daviess and State of Illinois, have invented a new and useful Improvement in Barbed-Wire Fences, of which the following is a specification:

In the accompanying drawing, forming a part of this specification, Figure 1 is a front view of a section of my improved fence; and Fig. 2 is a side view of the same, the wire cord being shown in cross-section.

Similar letters of reference indicate corresponding parts.

This invention relates to the manner of securing the barbs in the wire cords, of which this class of fences are now largely constructed; and it consists in combining with, and placing between, the strands composing the wire cord or cable barbs having projecting prongs or points, which are made to point in different directions, in such manner that when the strands of the fence are brought together in twisting the barbs will be firmly secured, substantially as hereinafter set forth.

By this manner of fastening the barb is secured as soon as the cable is twisted, and it may be completely formed before insertion.

In said drawing, A represents a four-pointed barb between the strands of a two-strand cable, B, illustrating my invention as applied to such a cable. The four prongs are bent near the center of the barb, the two at each end of the blank being bent from each other at an angle, so that the two prongs upon each side may be parallel with each other, and at an angle with the body or middle part of the plate, as shown in Fig. 2.

The barbs are placed between the strands, with the flat sides in line with the cable, and the strands are then drawn firmly down upon the barb by the twisting.

What I claim as new is—

The sheet-metal barb having several points, which are bent in several directions, in combination with a wire-fence cord, into which the barb is fastened by the twist of the cord, substantially as set forth.

HENRY N. FRENTRESS.

Witnesses:
C. S. BURT,
R. E. ODELL.